E. A. SPERRY.
NAVIGATIONAL INSTRUMENT.
APPLICATION FILED FEB. 3, 1915.

1,300,890.

Patented Apr. 15, 1919.

WITNESSES:

INVENTOR.
ELMER A. SPERRY
BY
Herbert H. Thompson,
ATTORNEY.

Fig. 9

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

NAVIGATIONAL INSTRUMENT.

1,300,890.   Specification of Letters Patent.   Patented Apr. 15, 1919.

Application filed February 3, 1915. Serial No. 5,819.

*To all whom it may concern:*

Be it known that I, ELMER A. SPERRY, a citizen of the United States of America, residing at Brooklyn, N. Y., have invented certain new and useful Improvements in Navigational Instruments, of which the following is a specification.

The invention relates to precision instruments in which the directive power in the position of equilibrium is small, but in which great accuracy is required. More specifically my invention relates to means for increasing the accuracy and sensitiveness of the gyroscopic compass, although it will be evident that the means I provide may readily be used on other types of precision instruments. A further object of my invention is to improve the means by which the readings of the master compass are transmitted to the repeater compasses.

What I now consider to be one of the preferred forms of my invention is shown in the accompanying drawings, in which:—

Fig. 1ª is a fragmentary vertical section taken on a vertical plane through the line 2—2 of Fig. 1, but looking in a direction opposite to that of the arrow.

Fig. 3ª is a fragmentary, detail view partly in section of the clutch connections shown in Figs. 1 and 3.

Figure 1:
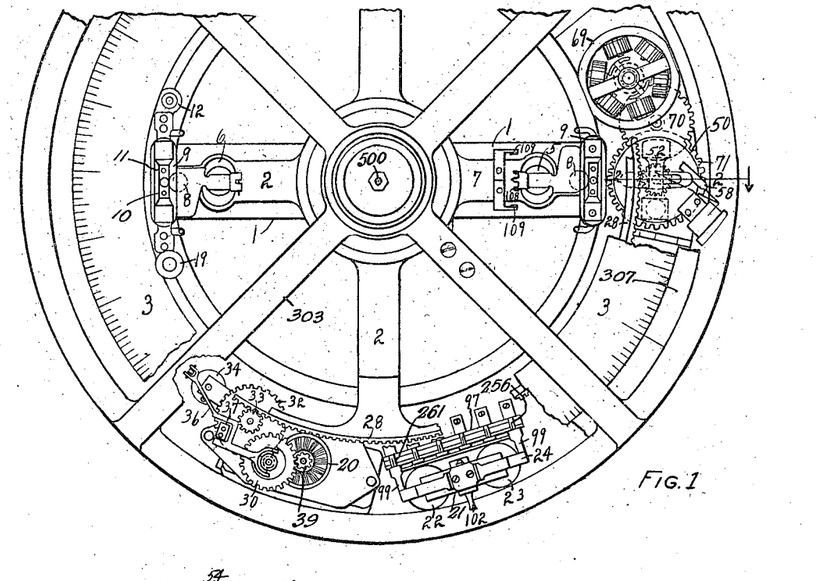
Figure 1 is a plan view of the master compass, parts being broken away to show the operating mechanism.
Figure 1A:
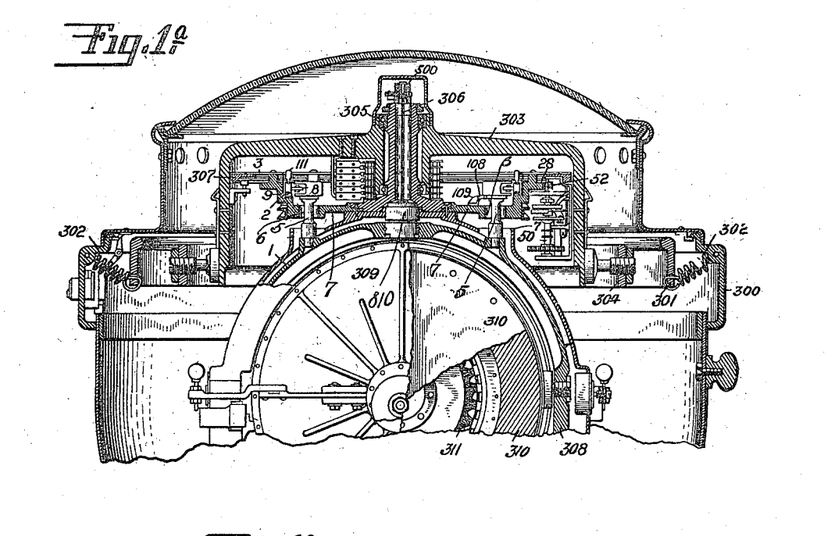

Referring to Figs. 1 and 1ª, it will be seen that the form of gyro-compass illustrated comprises a frame 300, which supports the ring 301 by means of springs 302. The spider 303 is pivotally supported by the cardan ring 304 which in turn is pivotally connected to the ring 301. The spider 303 supports the compass mechanism proper which comprises a sensitive element 1 and a follow-up device 2 which supports said sensitive element. The follow-up device 2 is rotatably mounted in the spider 303 by means of bearings 305 and supports the sensitive element 1 by means of the torsion wire 306 secured to the follow-up device at 500. The follow-up device carries also the compass card 3 adapted to coöperate with the lubber ring 307 carried by the spider. The sensitive element 1 comprises a vertical ring 308 suspended at the lower end of the torsion wire 306 and guided by a vertical bearing 810 at the top and a similar bearing at the bottom (not shown). Said element has pivotally connected thereto the gyro case 309 which rotatably supports and incloses the gyro rotor 310 adapted to be electrically driven by the stator 311. The follow-up device, besides carrying the compass card 3, is adapted to actuate whatever mechanism 50 is used to transmit compass readings to various parts of the ship. The specific object of the present invention is to improve upon the mechanism of the follow-up system and for this reason further detailed description of the gyro-compass is unnecessary. A more detailed description of the gyro-compass both as to structure and operation may be had by referring to my two prior applications 634,594 and 634,595 filed June 21, 1911. It should also be borne in mind that my invention may be applied to other forms of apparatus than herein illustrated.

The principal purpose of the follow-up system is to relieve the sensitive element of the necessity of doing work during its apparent arc-in-azimuth movements. The cause that gives rise to the most trouble in this regard is friction about the vertical axis. By this invention the friction is entirely eliminated.

Rising from the sensitive element are posts 5, which pass through slots or openings 6 in arms 7 of the follow up system, and which carry adjacent their upper ends parts of contact devices. Preferably these parts are in the form of brushes or trolleys 8.

Figures 4, 5, 7:
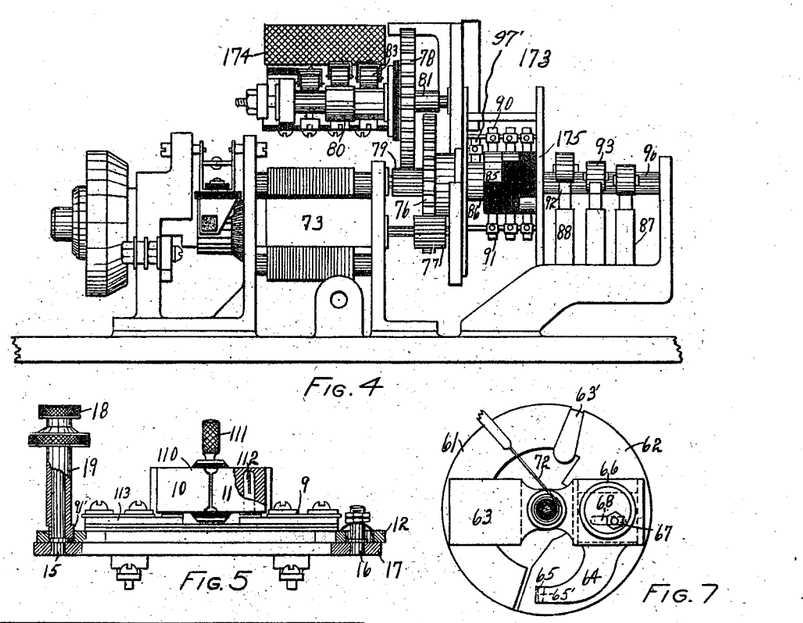
Fig. 4 is an elevation of the relay transmitter, which is designed to be placed on the switch panel.
Fig. 5 is an enlarged detail elevation of one of the contacts on the follow-up system.
Fig. 7 is a section on line 7—7 of Fig. 2, looking in the direction of the arrow, the brush 64 being shown removed from the position it normally occupies in order to show other parts more clearly.
Figure 6:
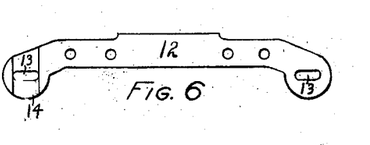
Fig. 6 is a detail thereof.

On the follow-up system coöperating contacts 9 are placed. Each contact comprises a pair of conducting strips 10 and 11, separated by an air gap. One or both of the contacts are preferably made adjustable in azimuth, as shown in Figs. 5 and 6. Each contact is mounted on an adjustable strip 12, provided adjacent each end with elongated holes 13 and at one end with a transverse slot 14. Posts 15 and 16 project up from the base 17, the former being elongated and surmounted by a knurled nut 18. A sleeve 19 is fitted loosely on post 15, and is adapted to be clamped between nut 18 and the base 17. The lower end 91', of said sleeve is eccentric, and fits in slot 14, so that piece 12 with its connected parts may be adjusted longitudinally by rotating sleeve 19. Nut 18 is used to clamp the parts in position after adjustment. By this or equivalent means the two contacts can be alined or thrown out of alinement for purposes hereinafter described.

Figure 9:
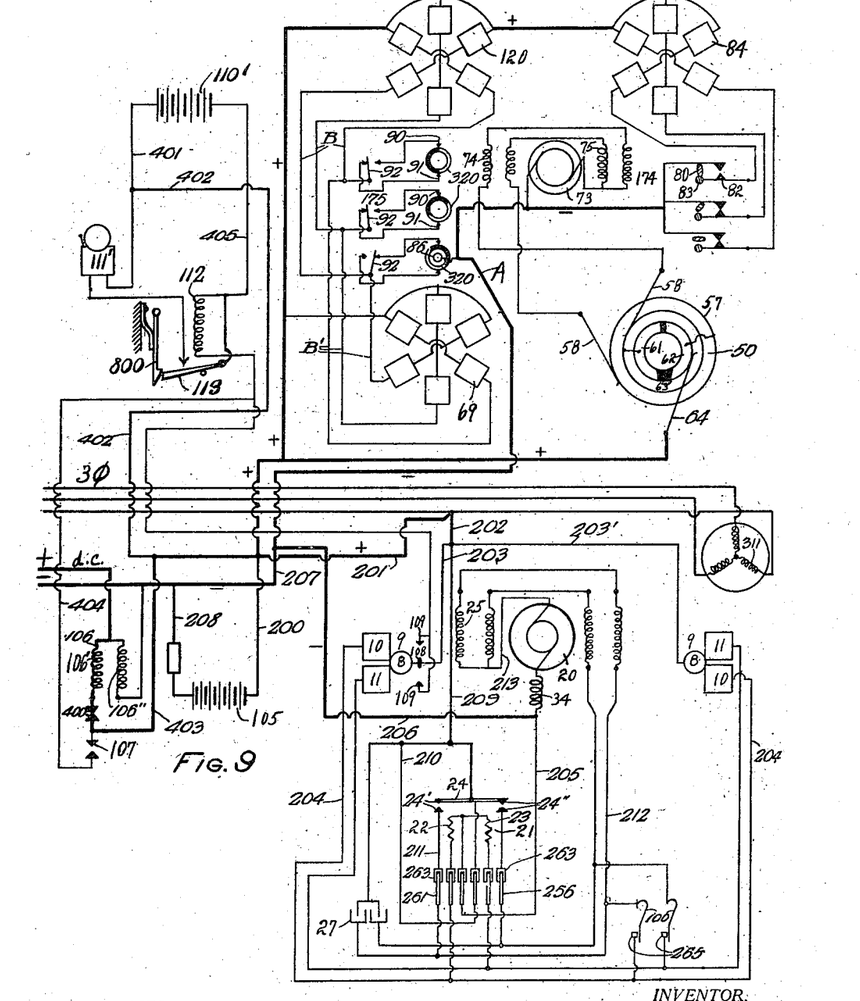
Fig. 9 is a wiring diagram of my complete system.
Figure 10:
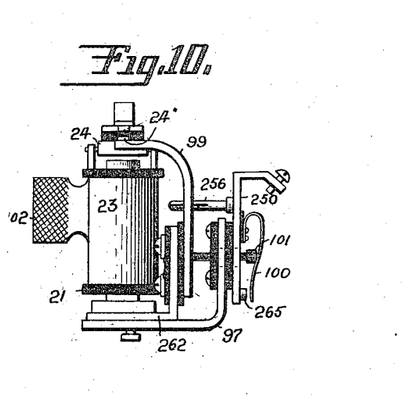
Fig. 10 is a detail side elevation of the follow-up relay and contact block forming a part of my invention.

According to my prior apparatus, the follow-up motor 20, which turns the follow-up device, was placed directly in circuit with these contacts, which arrangement is illustrated in Fig. 9 when the switches 100, 265 are closed and the relay 21 removed, the action of the device being that the trolleys would normally stand between the contacts with the whole system at rest until the ship turned, when, apparently, each trolley would move on to one contact and start the follow-up motor. It will be seen that as soon as the motor is started, friction about the vertical axis will be practically eliminated, but I have discovered that with this device before the motor is started, considerable friction may arise, due doubtless to the entire work of moving the contacts and sensitive element, initially, with respect to the follow-up system against what may be termed the relatively large static friction of the bearings and other parts falling on the sensitive element.

To eliminate this trouble, I provide automatic means to prevent the sensitive element and its support from coming to a condition of complete rest. Preferably I cause a continuous oscillation of the entire follow-up system through a small arc, so that the trolleys move first to one contact and then to the other, crossing and recrossing the separating insulation, but never coming to rest thereon. Hence the work of overcoming the inertia of the parts and the friction between the relatively movable surfaces at the vertical bearings and elsewhere is thrown entirely on the follow-up motor. Not only is friction eliminated thereby, but a great advantage accrues to the observer, since the constant hunting action of the compass card produced thereby serves to attract and hold his attention and furnishes a ready indication to him that the compass is operating properly.

My preferred means of causing this hunting oscillation or vibration is by placing a double relay 21 between the contacts 9 and the motor 20 (see Figs. 1 and 9). This relay comprises two electro-magnets 22 and 23, the former being in circuit with contact strips 10, while the latter is in circuit with contact strips 11. One contact of a switch 24' or 24" is mounted adjacent each end of a pivoted armature 24, so that on one of the magnets being excited a circuit is made through the corresponding differential field coil 25, and the armature of motor 20, thus causing the motor to be revolved in the proper direction. Thus, if trolleys 8, 8 are in contact with contact strips 10, 10 a circuit is formed through magnet 22 as follows: Starting with battery 105, through wires 200, 201, 203 (or 203') trolley 8, either of contacts 10, wire 204 (or 204'), magnet 22, wires 205, 206, 207, 208 and back to battery 105. Closure of the last mentioned circuit causes the magnet 22 to attract one end of the centrally pivoted armature 24 causing switch 24' to close the following circuit. Starting with battery 105, through wires 200, 201, 202, 209, 210, switch 24', wire 211, wire 212, one of field windings 25, wire 213, armature of motor 20, coil 34, wires 206, 207 and 208, and back to battery 105. Excitation of the other magnet will cause the reversal of the motor, as will be readily apparent. The armature 24 is centrally pivoted so that both contacts can not be closed at the same time so that a continuous reversing of the motor is caused as long as the position of the compass is fixed in azimuth. Condensers 27 to reduce sparking, may be connected across the spark gaps of the contacts.

Figure 11:
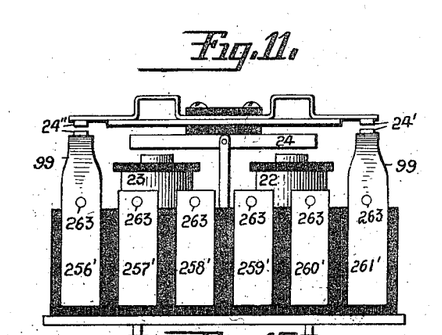
Fig. 11 is a detail rear elevation of the follow-up relay.
Figure 12:
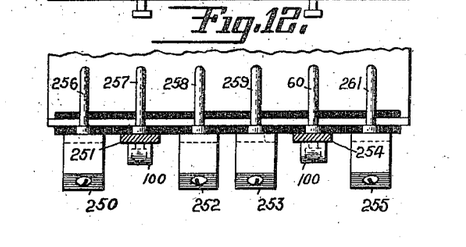
Fig. 12 is a fragmentary plan view of the contact block, certain of the parts being shown in section.

The magnitude of the oscillation imparted to the follow-up device can readily be adjusted by means of the adjustable contacts 9, the movement being a minimum when the two contacts 9 are diametrically opposite each other. The effect of shifting one contact 9 to a position where it is not diametrically opposite the other contact 9 is to cause the follow-up motor 20 to move the trolleys 8 farther to each side of the central position before said trolleys are on strips which are designated by the same reference numeral 10 or 11. The relay 21 will prevent the motor from becoming locked or from stopping, even if one trolley 8 should be moved far enough so that during the oscillation a period occurred in which one trolley is on one contact (10 for instance) while the other is on the opposite contact (11), since, if magnet 23 is energized while 22 continues to be energized, centrally pivoted armature 24 will remain attracted by magnet 22, as the magnetic flux is greater through the nearer portion of the armature. (See Fig. 11.)

Figures 2, 3, 3A:
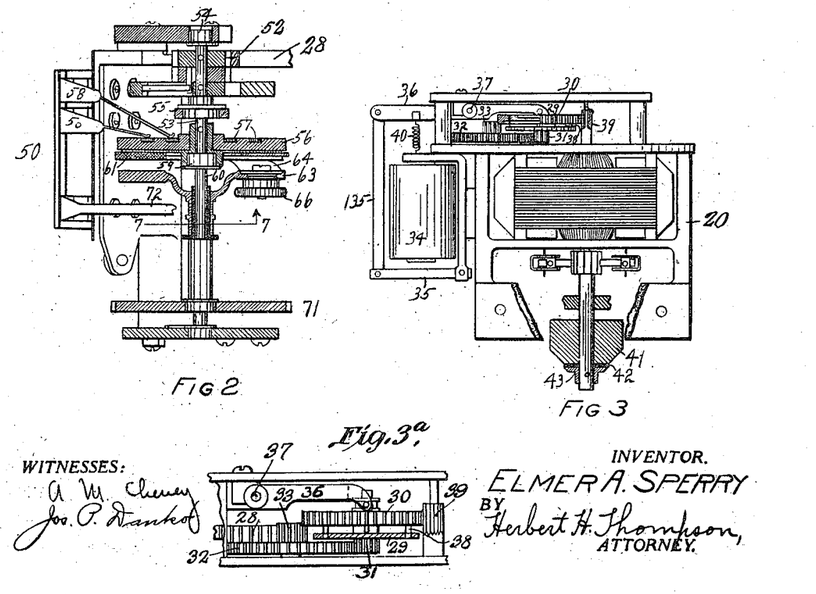
Fig. 2 is a vertical section of the master transmitter on line 2—2, Fig. 1, looking in the direction of the arrow.
Fig. 3 is a detail elevation, partly broken away of the follow-up motor.

Rotation is transmitted to the follow-up system from the motor 20 by means of a large gear 28 mounted beneath the scale 3, and reduction gearing on the motor 20, comprising a pinion 39 on the motor shaft, gears 30 and 31, and the gear 32 with its attached pinion 33 which meshes directly with the large gear 28 (see Figs. 1 and 3). An electro-magnetic clutch is connected with this gearing, which is designed to detach the system from the follow-up motor 20 on failure on the supply source. This comprises an electro-magnet 34, the armature 35 of which forms a lever connected through link 135 with an irregularly shaped lever 36. Said lever is pivoted to the frame at 37 and is pinned adjacent one end to a collar on the hub of gear 30, loosely mounted on the shaft of pinion 31 (see Fig. 3A). Pins 38 are provided on the opposite side of gear 30 to engage the notches in a toothed wheel 29 attached to pinion 31. Electro-magnet 34 normally holds the pins 38 in engagement with wheel 29, so that the motor is connected with gear 28, but as soon as the supply current fails, the magnet will be deënergized and spring 40 will disengage the clutch. The importance of this feature will be explained hereinafter.

As pointed out above, the entire follow-up system is rapidly oscillated by continually reversing motor 20. In order to cause as little shock to the parts as possible and to confine the extent of the oscillation within limits, I provide a novel device located preferably on the motor shaft, which I term a friction-inertia device. In construction, it comprises merely a small fly wheel 41 loosely mounted on the motor shaft, and resting normally on the friction face 42 of a collar 43 pinned to the shaft. By this means I provide a friction-inertia brake which will operate to reduce the shocks due to the continual reversing of the motor during its normal operation, but which will not oppose a continuous rotation thereof when the follow-up system is being rotated in azimuth.

In order to transmit the master compass readings to the repeaters, which is the second and not unimportant duty of the follow-up system, novel mechanism comprising what I term a master transmitter, 50, which is placed on the compass itself and a relay transmitter 173, which may be placed at a distance therefrom, preferably on the switch panel. This system is especially designed to provide means to transmit accurate readings without reproducing the hunting action of the follow-up device described above, in the repeaters. Preferably, said system is made adjustable, however, so that more or less of the vibrations may be transmitted if desired. Transmitter 50 is preferably attached so that it is rotated from the gear 28. It comprises a pinion 52 meshing with the gear 28 and secured to a shaft 53 which is supported in suitable bearings 54 and 55. Adjacent the lower end of the shaft is secured a disk 56 of insulating material, which is provided with a pair of slip rings 57 on its upper surface adapted to receive current through brushes 58. On the lower surface of the disk are secured a pair of contact segments 61 and 62, each segment being electrically connected to one of the slip rings 57. One of the strips of insulation 63' separating the ends of the segments is of considerable breadth and tapers outwardly for a purpose that will presently appear. The hub supporting said disk 56 is made with a concentric aperture 59 in its lower end, which serves as a bearing for the upper end of a second shaft 60.

Secured to shaft 60 is an arm 63 which carries a brush 64 adapted to contact with either of segments 61 or 62. The end of this brush is provided with a contact piece 65' tapered to correspond to 63' and is made radially adjustable by slidably mounting the other end of the brush in a groove in the holder 63. A rotatable thumb button 66 is provided with an eccentric pin 67, which enters a slot 68 in the brush, by means of which the position of the brush can be varied at will. Brush 64 is rotated by means of a repeater motor 69 through suitable reduction gears, such as 70 and 71, the latter being mounted on shaft 60. A brush 72 normally bears on the hub of arm 63 to lead the current to or from the brush.

In circuit with the brushes 58 is a reversible motor 73, forming a part of the relay transmitter shown in Figs. 4 and 9. This motor has oppositely wound field coils 74 and 75, similar to the follow-up motor, each coil being in circuit with one of brushes 58, so that the motor is driven in one direction when brush 72 is on segment 62 and is reversed on segment 61, being brought under the brush. Dead section 63' furnishes a section where motor 73 will remain at rest and becomes the means for preventing hunting in the repeating or analogous instruments. By means of its tapering shape in connection with the radial adjustability of brush 64, the device can be so adjusted that the hunting action carries the brush to each edge of section 63', so that the slightest movement beyond the normal will cause a contact and operate the motor 73, but so that the normal hunting action will not be transmitted. This adjustment in connection with the adjustment of the amplitude of oscillation of the follow-up device, also furnishes a ready means of transmitting the vibrations of the device to the repeaters, to a greater or less extent as desired, as will be readily apparent.

Motor 73 furnishes the power for operating the transmitters proper, which send their impulses directly to the repeating instruments 84 and 120. It is preferably placed on the switch panel and forms with the connected transmitters the instrument I term the relay transmitter. It is shown as geared to two transmitters 174 and 175 adapted to operate at different speeds. That is, transmitter 174 is used to actuate instruments of ordinary calibration, while transmitter 175 is used to secure a much finer degree of accuracy. The latter is shown as mounted on the shaft of gear 76, driven by the motor pinion 77, while the former is driven from gear 78 which meshes with a pinion 79 on the shaft of gear 76.

The action of transmitter 174 is shown in Fig. 9, in which the three cams 80, which are in reality mounted on the same shaft 81 (Fig. 4) are shown as separated. These cams lift the contact fingers 82 successively, by bearing against rollers 83 on the ends of the fingers. From the fingers wires lead to the repeater motors, represented by 84.

Transmitter 175 comprises a rotary three section commutator 85, provided with a common return section 86. Each section has a conducting segment of about 180° arc. Brushes 90 and 91 are placed diametrically opposite and make contact with each section, while a single brush 97' bears on section 86.

In circuit with each pair of brushes 90 and 91 is a vibratory contact member 87 (see Fig. 8) comprising two stationary contact pieces 88 and 89, each in circuit with one of said brushes. Pivoted between these pieces is a finger 92, designed to be rapidly vibrated by a roller 93 mounted on a spring pressed arm 94, which may be reciprocated by a cam 95 on the shaft 96.

Figure 8:
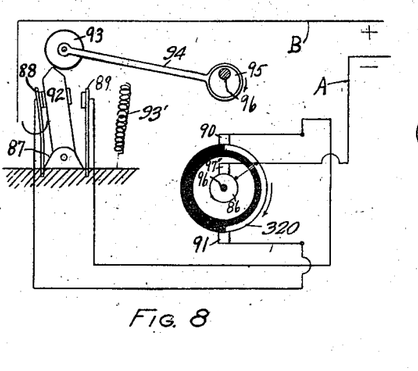
Fig. 8 is a diagrammatic view of a portion of Fig. 4.

The parts are so designed that the operation is substantially as follows, assuming that the shaft 96 is rotating in the direction of the arrows shown in Fig. 8. The current is flowing through wire A, brush 97, common return segment 86, segment 320, brush 91, contact 88, arm 92 to wire B. Let us suppose now that the shaft 96 rotates 90°. The roller 93 slips over the top of arm 92 just as it nears its extreme left hand position so that the spring 93' pulling down on the roller arm snaps the arm 92 over into engagement with contact 89. Thus the above traced circuit is broken at 88 with a quick break. At this time brush 90 is on an insulating segment so that the circuit cannot be closed through contact 89. Assuming now, that the shaft rotates through another 90°—the arm 92 is still in engagement with contact 89 and as the brush 90 is now engaged by segment 320 a circuit from A to B is closed through the said brush 90 and contact 89. This circuit remains closed until a further rotation of 90° of the shaft 96 takes place. The roller 93 then rides over the top of arm 93 as the former is traveling to the right and breaks the circuit at 89 with a quick break, the arm 92 then engaging the contact 88. Although the last named contact is in engagement with arm 92 at this point, the brush 91 is in the middle of the insulating segment so that no circuit is made from A to B until another 90° turn is made by the shaft 96. From this description of one cycle it is clear that there are two impulses through the circuit A, B, for one revolution of shaft 96 and that each of these lasts approximately for a quarter revolution. It will be noted that the cricuit is broken at the switch arm 92 thus giving a quick break and making a greater commutator speed possible. Furthermore, it will be seen that with this arrangement the number of impulses per revolution is double the number possible if the commutator alone were used.

While, in describing the commutator sections, I call them 180° sections, it will be understood that I intend to include all sections which approach this dimension, it being well known that the exact dimensions are varied to suit the thickness of brush employed.

Not only is transmitter 175 used in actuating the repeating instrument 120, but also the motor 69 on the master transmitter 50 on the compass, thus furnishing an accurate follow-up connection between the master transmitter and relay transmitter 175.

The transmitter 175 is connected through the conductors B to corresponding magnets of the repeater motor 120 and through conductors B' to corresponding magnets of the repeater motor 69. Thus repeater motors 69 and 120 are connected in parallel with each other and in series with transmitter 175.

Under certain conditions it is desirable to remove the relay 21 without disturbing the operation of the rest of the system. I, therefore, provide means whereby when the relay is removed its circuits are automatically broken and the contacts 10, 11 connected automatically to the motor (20) circuits, (see Figs. 9 to 12, inclusive). A contact or terminal block 97 is provided on the frame of the compass and carries terminal plates 250, 251, 252, 253, 254 and 255 each insulated from the others and from the main portion of the contact block and carrying plugs 256 to 261 respectively. The relay 21 is mounted on a bracket 262 which can be attached and detached readily from the contact block 97, a finger hold or grip 102 being provided to aid in this operation. The bracket 262 carries a series of contact plates 256' to 261' each insulated from the others and from the bracket 262 and each provided with a hole 263. The holes 263 form sockets into which the plugs 256 to 261 are adapted to enter, thus connecting the plates 250 to 255 to the plates 256' to 261' respectively. By connecting the sockets (256' to 261') to the various relay elements and the plugs (256 to 261) to the various conductors as indicated in Fig. 9, it will be apparent that I have provided readily detachable connections for the relay. It will be noticed that all of the plates 256' to 261' are identical except the two end plates, which are each shown as provided with bent over end portion 99, which each carry one of the contacts 24' 24". When the relay 21 is removed and consequently disconnected the members 10 and 11 should each be connected directly to the circuits of the motor in order that the operation of the system be uninterrupted. While this function might be performed by a separate manual operation I prefer to provide means whereby it is accomplished by the withdrawal of the relay 21 from contact block 97. For this purpose I provide each of the plates 251, 254 with a contact 265 and a spring contact 100. Each of the contacts 265 is connected by its plate 251, 254 directly to members 11 and 10 respectively while the contacts 100 are each connected to a corresponding motor (20) field lead (See Fig. 9). Thus each member 10, 11 is connected to the corresponding field lead of the motor 20 through a switch 100, 265. These switches are closed by the action of spring contacts 100, when the relay 21 is removed and to open them automatically when the relay 21 is placed in position, I provide each switch with a non-conducting rod 101 slidably mounted in the contact block 97 and adapted to be engaged by plates 257', 260' of the relay 21 to raise the contacts 100. Preferably the plug 256 to 261 are made long enough to complete the relay circuits before contacts 100 are raised on placing the said relay in position.

For operating all of the above described mechanism, including the gyro-wheel itself, but two circuits are used, a three phase A. C. circuit for the induction motor 311 of the gyro, and a low voltage D. C. circuit for all of the other instruments. While it is important that neither supply should fail, it will readily be appreciated that the follow-up system should be made, if anything, more infallible than the gyro-wheel itself, since the gyro will maintain its rotation and perform its functions several hours after the power is shut off, while without safeguards a failure in the follow-up system would immediately result in throwing the compass readings, and, in a short while, the compass, itself, off the meridian. To prevent such failures, I provide a storage battery 105 which normally floats on the line, but which assumes the entire load on failure of the D. C. supply. A reverse current relay 106 serves to prevent the battery discharging back into the line. An alarm contact 107 is also operated by said relay so that the operator is immediately notified of the failure of the D. C. supply. Additional safeguards are provided on the compass itself.

The construction and operation of the relay 106 is substantially as follows. The relay is made up of two coils or windings 106' and 106", the former of which is adapted to be cut into and out of series with the positive side of the D. C. line (see Fig. 9) while the latter is connected permanently across said line. If the source of direct current is at sufficient potential to charge the battery 105 the coil or winding 106" is energized to sufficient strength to close the front contacts 400 so that the D. C. supply charges the battery and also supplies energy to the main line throughout the system, as indicated in heavy lines in Fig. 9. When front contacts 400 close, the coil 106' is energized to aid the coil 106" in maintaining the front contacts closed. If for any reason the voltage of the line drops below that of the battery 105, the current through the coil 106' will reverse so that the last mentioned coil will oppose and weaken the pull of the coil 106" and the front contacts 400 open and back contacts 107 close. When the front contacts 400 open, the D. C. supply is cut off from the main line of the system and the latter is supplied by the storage battery 105. This condition persists until the voltage of the D. C. supply is high enough to energize coil 106" to such magnitude as to close the front contacts 400.

As stated above a marked drop in voltage of the D. C. supply causes the back contacts 107 to close and these contacts on closing cause the alarm to sound. Thus when contacts 107 close a circuit is formed as follows: Starting with battery 110' through wires 401, 402, 403, contacts 107, wire 404, relay 112 and wire 405 back to battery 110'. The energization of relay 112 closes front contacts 113 to close a circuit from battery 110' through wire 401, bell 111' contacts 113 and wire 405 back to battery 110', thus causing the alarm to sound. On inspection of Fig. 9 it will be seen that the contacts 108, 109 hereinafter referred to are in parallel with contacts 107 and therefore the former cause energization of the relay 112 and bell 111' in identically the same manner as said contacts 107.

An important feature is the provision of the double alarm contacts 108 and 109 preferably located respectively on a post 5 of the sensitive element, and on an arm 7 of the follow-up system. On referring to Figs. 1 and 9, it will be seen that one set of these contacts will be closed and the alarm sounded as soon as the follow up system falls a predetermined arc out of line with the sensitive element no matter what the cause is. A further safeguard is the provision of a throw-out clutch such as 29—38 operated by magnet 34 and described specifically above.

The importance of these two safeguards may be appreciated, when it is remembered that in case the follow-up motor should fail and the ship should be turned in azimuth, the posts 5 would strike against one end of slot 6, exerting a torque on the follow-up system. Thus the ends of slots 6 acting in conjunction with posts 5 (see Figs. 1 and 1ᴬ) form limit stops to limit the extent of relative movement in azimuth between the sensitive element 1 and follow-up device 2.

If no means were provided to throw out motor 20, the friction of the motor bearings and brushes, multiplied many times by the reduction gearing 30, 31, 32, 33 would offer a powerful resistance to the apparent movement of the gyro-wheel, causing undesirable precession and consequent injurious strains on the whole apparatus. With the motor disconnected, however, the gyro is able to carry the follow-up card 3 with it, so that the readings remain fairly accurate. The alarm, of course, is also sounded through contacts 108, 109. The transmission system is also designed to offer as little resistance as possible to rotation of the follow-up system. That is, the transmitters 174 and 175, which are used to actuate directly the repeater motors, are not mounted on the compass but are independently driven from the relay motor 73. The control of motor 73 by master transmitter 50 requires very little power from the follow-up system, especially since motor 69 aids in rotating said transmitter 50.

The alarm system is supplied with a separate battery 110', and a bell or other signal 111'. A relay 112 may be placed in the circuit which operates to close a new circuit, upon the closing of one of the alarm circuits, which will remain closed until opened by hand, so that the bell when once started, will ring continuously. For this purpose a locking dog 800 is provided to hold the contacts 113 together after they are once closed by solenoid 112.

Calling particular attention to Fig. 9 the operation of my system may be summed up as follows: With the connections made as shown and the sensitive element 1 stationary, the contacts 8, 10 and 11 which are in series with the relay coils 22, 23 across the main line will energize one or both of the latter. One or the other of the contact sets 24', 24'' will therefore be constantly closed as previously pointed out and as these contacts control the fields 25 of the motor the latter will be constantly running and oscillating the follow-up 2 through a predetermined arc. The follow-up 2 drives the contacts 61, 62 through the gearing 28, 52 but due to the width of the insulation 63' the brush 64 does not follow the oscillations of said contacts 61, 62. When the sensitive element changes position the contacts 8, 10, 11 acting through the relay 21 cause the motor 20 to run in such a direction as to cause the member 2 to follow the movement of the sensitive element 1. This movement of member 2 causes a movement of the contacts 61, 62 sufficient to move the insulation 63' away from brush 64 so that the latter will be in engagement with one or the other of said contacts 61, 62. The motor 73 which is in series with brush 64 and contacts 61, 62 across the main line, is thus energized to cause it to rotate in the proper direction. The last mentioned motor mechanically drives both of the transmitters 174 and 175. The transmitter 174 being in series with the repeater motor 84, across the main line, energizes said motor to cause it to repeat the movement of said transmitter. Transmitter 175, being in series with repeater motors 69 and 120 across the main line, likewise causes these motors to repeat its movement. The repeater motor 69 acting through gears 70, 71 rotates the brush 64 to cause the latter to follow the movement of the contacts 61, 62. Thus the repeater motor 84, 120 and consequently the repeater compasses actuated thereby will constantly be positioned in accordance with the position of the sensitive element 1 of the master compass.

If the relay 21 is removed, its circuits are automatically broken, as previously described, and the switches 100 close automatically. The motor 20 is then directly in series with contacts 8, 10, 11 and therefore directly controlled thereby. The operation, under this condition, is essentially the same as that above described except that relay 21 no longer enters into the operation.

Should the D. C. main line become dead the relay 106 functions to close its back contacts 107 to cause energization of the alarm 111' (as previously described), to warn the operator. Under this condition the battery 105 supplies energy to the main line.

Any failure of the main supply between battery 105 and motor 20 will cause deënergization of coil 34 to disconnect said motor from the follow-up 2, thus allowing the sensitive element 1 to move the latter with comparatively small exertion of force. The last mentioned actuation takes place through posts 5 and the walls of slot 6 and it will be clear that under this condition the contacts 108 and 109 close to cause the alarm 111' to apprise the operator of the above mentioned failure.

In order that the contacts 10 and 11 may be readily replaced or vertically adjusted to present a new wearing surface, they are made in the form of a little block 110, with a finger hold 111, and with holes in the bottom to engage over resilient studs 112, rising from plates 113 which are secured to piece 12, referred to above.

It should be noted that in the normal operation the trolleys 8 are in contact with one or the other or both of contacts 10, 11 at all times. It is therefore clear that if the relay 21 is removed the clutch magnet 34 is energized at all times. If the relay 21 is employed the circuit of said magnet 34 is broken whenever the armature 24 changes position. In view of the fact that the duration of this break is short and due to the inertia of the clutch parts, chattering of the latter does not take place.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. The combination with a gyro-wheel and casing, of means for supporting the same for free movements in azimuth comprising a supporting element mounted for movement in azimuth and means for causing said element to follow the apparent arc-in-azimuth movements of said wheel, and means associated with said other means for causing a hunting action of said element.

2. In a gyro-compass, the combination with the sensitive element, of a mechanical suspension for said sensitive element, a rotary support for said suspension and means for vibrating said support through a predetermined angle with respect to the position of said sensitive element.

3. In a gyro-compass, the combination with the sensitive element, of a rotary supporting element for said sensitive element, a motor connected to said supporting element for rotating it, controlling contacts for said motor adapted to cause normally both a vibratory and rotary motion thereof about its vertical axis, and a friction-inertia device connected with said motor adapted to limit the extent of the vibrations thereof but not to oppose a continuous rotation.

4. In a gyro-navigational instrument, a sensitive element, and a follow up device for relieving the sensitive element of the work necessary to cause apparent arc-in-azimuth movements of said element device, including a motor for driving said device, controlling contacts between said device and element, and a relay in the electrical connections between said contacts and motor, adapted to prevent the motor from becoming locked.

In a gyro-navigational instrument, a sensitive element, a follow-up device for relieving the sensitive element of the work necessary to cause a parent arc-in-azimuth movements of the sensitive element, including a motor for driving said device, and a friction-inertia mass connected to said motor.

6. In a gyro compass a sensitive element, a follow-up support for said element, an alarm and alarm contacts connected to said element and support adapted to excite said alarm upon the angle between said parts exceeding a predetermined value.

7. In a navigational instrument, a sensitive element, a follow-up support for said element, electrical means for driving said support and an alarm so connected with said means that a signal is given upon failure of said means to operate.

8. In a navigational instrument, a sensitive element, a follow-up support for said element, electrical means for driving said support, a source of electrical supply therefor, an alarm, contacts connected to said element and support, adapted to be closed upon the angle between said parts exceeding a predetermined value, other contacts adapted to be closed upon failure of the supply source for said electrical means, both sets of contacts being arranged to actuate said alarm.

9. In a navigational instrument, a sensitive element, a follow-up support for said element, electrical means driving said support, contacts connected to said element and support, adapted to be closed upon the angle between said parts exceeding a predetermined value, other contacts adapted to be closed upon failure of the supply source for said electrical means, and an alarm in circuit with both of sets of contacts.

10. In a navigational instrument, a sensitive element, a follow-up support for said element, electrical means driving said support, contacts connected to said element and support, adapted to be closed upon the angle between said parts exceeding a predetermined value, other contacts adapted to be closed upon failure of the supply source for said electrical means, an alarm in circuit with said contacts and a relay interposed in the circuit whereby the alarm will continue to ring when once started until the relay is reset.

11. In a navigational instrument, a sensitive element, a follow-up direction indicating member for said element, electromechanical means for driving said member, and automatic means for disconnecting said means mechanically from said member upon failure of the supply current for said means.

12. In a navigational instrument, a sensitive element, a follow-up support for said element, limit stops and electric contacts between said element and support, a motor in circuit with said contacts and geared to said support for maintaining it in a centralized position between said stops, and automatic means for disconnecting said motor from said support on its failure to operate.

13. In a navigational instrument, a sensitive element a follow-up support for said element, limit stops and electric contacts between said element and support, a motor in circuit with said contacts and geared to said support for maintaining it in a centralized position between said stops, and automatic means for disconnecting said motor from said support, and for sounding an alarm on failure of the motor.

14. In a precision instrument, a sensitive element, a rotary support for said element, a plurality of pairs of reversing contacts and coöperating contacts mounted so as to receive relative movement by the relative movement of said element and support, means controlled by said contacts for causing said support to hunt continually the position of the element, and means for varying the amplitude of the hunting action.

15. In a precision instrument, a sensitive element, a rotary support for said element, a plurality of pairs of reversing contacts and coöperating contacts mounted so as to receive relative movement by the relative movement of said element and support, means controlled by said contacts for causing said support to hunt continually the position of the element, and means for shifting the relative position of said pairs of contacts whereby the amplitude of the hunting action is varied.

16. In a precision instrument, a sensitive element, a rotary support for said element, a pair of reversing contacts and a coöperating contact therefor mounted so as to receive relative movement by the relative movement of said element and support, a relay in circuit with said contacts and a reversible motor in circuit with said relay and connected to said support whereby said support is caused to hunt continually the position of the element.

17. In a precision instrument, a sensitive element, a rotary support for said element, a plurality of pairs of reversing contacts and a coöperating contact for each pair mounted so as to receive relative movement by the relative movement of said element and support, a relay in circuit with said contacts, a reversible motor in circuit with said relay and connected to said support whereby said support is caused to hunt continually the position of the element, and means for shifting the relative position of said pairs of contacts whereby the amplitude of the hunting action is adjusted.

18. In a precision instrument, a sensitive element, a rotary support for said element, a plurality of pairs of reversing contacts and a coöperating contact for each pair mounted so as to receive relative movement by the relative movement of said element and support, motive means controlled by a pair of said contacts for causing said support to hunt continually the position of the element, and other motive means controlled by another pair of said contacts for transmitting the angular position of the support to a repeating instrument without transmitting the hunting.

19. In navigational apparatus, the combination with a power driven vibratory device, and a repeating instrument, of means for varying the amplitude of the vibrations of said device and of transmitting means actuated from said device for controlling said repeater, comprising a plurality of movable contact members and a movable brush member, one of said movable members being primarily actuated from said device, while the other is a follower, a tapering dead section between said contacts, said brush being transversely adjustable whereby the true readings of the device may be transmitted without the vibrations.

20. In a gyro-navigational instrument, a sensitive element, a follow-up device for relieving the sensitive element of the work necessary to cause the apparent arc-in-azimuth movements of the sensitive element, a motor for driving said device, controlling contacts between said device and element, and a detachable relay for normally controlling said motor, directly, in circuit with said contacts, and means for automatically breaking the relay circuits and for forming a direct circuit between said motor and contacts, on said relay being physically detached from the instrument.

21. In a gyro compass, an azimuth movable unit, a contact member connected therewith so as to be moved thereby, a coöperating contact member, contacts borne by said members, a motor actuated from said contacts, a transmitter driven thereby, and a repeater motor actuated from said transmitter and connected to said second member to cause it to follow said first member.

22. In a gyro compass, a sensitive element, a follow-up support therefor, coöperating contacts connected to each of said members, a motor actuated from said contacts and connected to drive said support, a second motor, a transmitter driven thereby, a repeater motor actuated from said transmitter, and a second set of coöperating contacts having parts operatively connected respectively to said support and said repeater motor, said second motor being actuated from said second contact set.

23. In a gyro compass, a sensitive element, a follow-up support therefor, a motor connected to drive said support, a second motor a transmitter driven thereby, a repeater motor actuated from said transmitter, a plurality of contacts whose relative position is controlled by two of said motors, said second motor being actuated from said contacts.

24. In a precision instrument, a sensitive element, a rotatable support therefor, a contact member connected with one of the parts named, coöperating reversing contacts on the other of said parts, a relay in circuit with said contacts comprising a pivoted armature, a pair of contacts thereon on opposite sides of the pivot; coöperating contacts therefor, electromagnetic means for oscillating the armature as a circuit is closed through one or the other of the reversing contacts, and a reversible motor in circuit with the relay contacts.

25. In a navigational instrument, a sensitive element, a follower-up support for said element, limit stops and electric contacts between said element and support, a motor in circuit with said contacts and geared to said support for maintaining it in a centralized position between said stops, a source of supply for said motor, a clutch in the connections between the motor and the support, means for normally holding the clutch disconnected and electro-magnetic means adapted to hold the clutch closed when supplied with normal current from said supply.

26. In a navigational instrument, a sensitive element, a follow-up direction indicating member, limit stops and electrical contacts between said element and member, and a motor in circuit with said contacts and connected to said member, whereby said member may be turned directly by the sensitive element on failure of the motor.

27. In a navigational instrument, a sensitive element, a follow-up member, limit stops and electrical contacts between said element and member, a transmitting device driven by said member adapted to control a repeating instrument, and a motor in circuit with said contacts and connected to said member, whereby said member and its transmitter may be turned directly by the sensitive element on failure of the motor.

28. In a navigational instrument, a sensitive element, a follow-up member, limit stops and electrical contacts between said element and member, a transmitting device driven by said member adapted to control a repeating instrument, a motor in circuit with said contacts and connected to said member, and automatic means for disconnecting said motor from said member on its failure to operate.

29. The combination with a master indicator, of a transmitting device comprising movable reversing contact members, a movable brush member, a repeater motor connected to one of said movable members, another of said members being adapted to be driven from the master indicator, a reversible motor in circuit with said contact members and brush member, and a step-by-step transmitter connected to said reversible motor, said repeater motor being in circuit with said transmitter.

30. In navigational apparatus, a master direction indicator, a pair of reversing contacts and a coöperating brush, one of said parts being connected so as to be moved by the apparent arc-in-azimuth movements of the indicator, a reversible motor in circuit with said parts, a plurality of transmitters driven by said motor at different speeds adapted to actuate step-by-step repeater instruments at different speeds, and a step-by-step repeater motor connected with the other of said parts and in circuit with the higher speed transmitter.

31. In navigational apparatus the combination with a vibratory follow-up device, and a repeating instrument, of transmitting means actuated from said device for controlling said repeater, comprising a plurality of movable contacts and a movable brush, one of said movable devices being primarily actuated from said device, while the other is a follower and a tapering dead section between said contacts, said brush being transversely adjustable whereby the true readings of the device may be transmitted without the vibration.

32. The combination with a master instrument, of a transmitting device comprising movable reversing contacts, an insulated section of predetermined breadth separating said contacts, a movable brush, a repeater motor connected to one of said movable members, another of said members being adapted to be driven from the master instrument, a reversible motor in circuit with said contacts and brush, and a step-by-step transmitter connected to said motor, said repeater motor being in circuit with said transmitter.

33. In angle measuring apparatus, in combination with a master indicator which is normally in a state of constant vibration, of a repeating instrument, and means operated by said master indicator for causing said repeater to follow only the angular movements of the master which exceed the normal extent of its vibrations.

34. In combination, a master compass, a transmitter connected to said master compass, a receiving instrument electrically connected to said transmitter, a source of E. M. F. for energizing said receiving instrument and means for giving a signal on failure of said source.

35. In a gyro-compass, a gyroscopic member, a second member, supporting and guiding means for supporting said gyroscopic member on said second member for turning with respect thereto, and means for imparting to said members continuous relative vibrations.

36. In a gyro-compass, a gyroscopic member, a second member, supporting and guiding means for supporting said first member on said second member for turning with respect thereto, reversible motive means connected to said second member, reversing contacts carried by said two members for operating said motive means and means for causing said motive means to continually reverse.

37. In a gyro-compass, a gyroscopic member, a second member, supporting and guiding means for supporting said first member on said second member for turning with respect thereto, means for imparting to said members continuous relative vibrations, and means whereby the extent or amplitude of the vibrations may be varied.

38. In a navigational instrument, the combination with a sensitive element, a follow-up device for supporting the same, an indicating means on said device, and means for imparting to said device a vibratory movement.

39. In gyro-navigational apparatus, the combination with a gyroscopic element, a follow-up device, a transmitter driven by said device, a repeater system actuated thereby and means for imparting to said device and transmitter continuous vibratory movements.

40. In a gyro-compass, a gyroscopic member, a follow-up or repeating indicating device, and means for imparting to said device vibratory motion in addition to its normal motion in following the movements of said member.

41. In a precision instrument, a movable sensitive element, a supporting follow-up element therefor, and means for imparting to one of said elements continuous relative vibrations.

42. A frictionless support for sensitive elements comprising a bearing frame, a support journaled thereon, a sensitive element supported and guided for rotation on said support and means for imparting relative vibrations to said support and element.

43. In combination, a directionally sensitive element, a relatively movable support, a bearing between said element and support, one part of said bearing being fixed to said element, the other part of said bearing being fixed to said support and means for imparting relative vibrations to said element and support.

44. In combination, a directionally sensitive navigating instrument, a remotely located repeating instrument controlled thereby and means for periodically reversing said instrument although the course is unchanged.

45. In a gyroscopic compass for ships, the combination with a power source of electrical supply, a gyroscopic rotor driven therefrom, a follow-up motor also driven therefrom, a battery, and means responsive to the failure of the supply for causing the battery to drive the motor.

46. In a gyroscopic compass for ships, the combination with a power source of electrical supply, a gyroscopic rotor driven therefrom, a repeater system also driven therefrom, and a battery so connected in the repeater circuit as to drive the same upon failure of the first mentioned supply for said motor.

47. In a gyro-compass, a directive element, a support therefor, said element and support being relatively movable, means for imparting thereto continuous relative vibrations, a repeater compass, and means operated by the gyro-compass for causing said repeater to reproduce only the directive movements of the elements.

In testimony whereof, I have signed my name to this specification in the presence of two subscribing witnesses, this 21st day of January 1915.

ELMER A. SPERRY.

Witnesses:
P. L. ANDERSON,
ETHEL N. BAUMGARTNER.